March 20, 1951      F. HANEL      2,545,578

ANTISKID DEVICE FOR MOTOR VEHICLES

Filed Sept. 28, 1949

Inventor:
F. Hanel
By E. F. Wenderoth
Attorney

Patented Mar. 20, 1951

2,545,578

UNITED STATES PATENT OFFICE 2,545,578

ANTISKID DEVICE FOR MOTOR VEHICLES

Franz Hanel, Baden, Germany

Application September 28, 1949, Serial No. 118,215
In Germany July 2, 1949

7 Claims. (Cl. 280—150)

1

The present invention relates to an anti-skid device for motor vehicles of the type comprising a movable weight which moves, in a direction opposite to that of the skidding movement of the vehicle, against a counter pressure.

In the case of known anti-skid devices, the weight member is at unnecessarily great distances from the wheels and, there had to be provided flexible covering sleeves which were subjected to rapid wear, especially owing to stones, splinters and the like which were flung against them during the travel of the car. An object of the present invention is to provide an anti-skid device for motor vehicles of the type described overcoming the drawbacks of the prior devices of this character.

Figure 1:
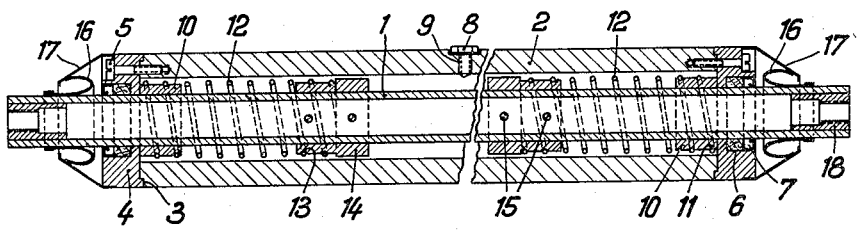
Figure 2:
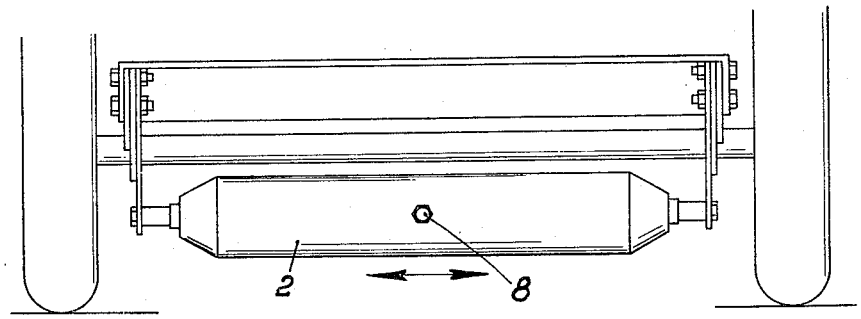

Further features of the invention will be seen from the description in which an example of embodiment of the invention is described with the aid of the accompanying drawings, of which Fig. 1 is a sectional view of the anti-skid device according to the invention and Fig. 2 is an elevation of the back-wheel axle of a motor vehicle with the anti-skid device fixed to the chassis of the vehicle.

Arranged displaceably on a tubular rod 1, which is parallel to the axle of the back wheels of the motor car and is advantageously fixed by flat iron bars between the ends of the chassis or an extension thereof, is a weight member 2 consisting of a cast-iron tube. The weight-member tube 2 is milled to a plane surface at its two ends and is provided at each end with an adaptor 3 which carries slip ring type abutments 4 slidably mounted on the rod 1 and gives it its exact axial position. The abutments 4 may be made of light metal in a chill mold or the like, so that hardly any machining is necessary. The fixing of each abutment 4 to the weight-member tube 2 at each end is effected by means of three screws 5 which are secured against loosening by Seger rings. The abutment 4 receives a felt ring 6 in front of which a spring clip 7 is placed as a closure of the bore and as an oil seal. The inner space of the tube can consequently serve for receiving oil or other lubricant which is fed to the inner space through a filling aperture 9 which is provided in the weight member and is closable by means of a screw 8. On the inner end of each of the abutments 4 there is provided a sleeve 10 which is provided with a helical groove 11 into which are screwed turns of a spiral buffer spring 12 which surrounds the rod 1. The other end of each spring 12 is screwed on an adjusting ring 14 which is likewise provided with a helical groove

2

13. Each of the adjusting rings is pushed on the tubular rods and can be fixed in the desired position by grub screws 15. The adjusting rings 14 adapted to be secured to the rod 1 and forming a stationary abutment are advantageously fixed in such a position that the buffer springs 12 are given a certain pre-stressing which conforms to the weight of the weight member or the weight of the car.

In order to protect the sliding surfaces of the anti-skid device from dust and dampness, there is provided, at each end of the weight-member, a protecting device which consists essentially of a dust-collecting sleeve 16 and of a metallic covering cap 17 which encloses the latter. The dust-collecting sleeve 16 is made of a flexible material, such as rubber, leather, textile material or the like and is fixed, on the one hand, on the rod 1 by means of a clamping ring (not shown) and, on the other hand, to the inside of the covering cap by means of rivets or the like. The rigid covering cap is somewhat funnel-shaped, is mounted firmly on an annular groove in the abutment 4 and extends to near the rod 1 in order to permit the passage of the dust-collecting sleeve 16, which, owing to its flexibility, allows a movement of displacement of the weight member.

Into each outer end of the tubular rod 1, there is inserted a socket 18, the outer part of which is provided with a screw-threaded bore. These screw-threaded bores serve for receiving screws by means of which the whole device is fixed to the chassis. A method of fitting the anti-skid device to the chassis is represented, by way of example, in Fig. 2.

When the vehicle is travelling, the weight-member swings to and fro under the influence of the centrifugal forces of the vehicle and the action of the buffer springs and always shifts its weight in such a manner that a releasing of the back wheel, which is located in the inner curve, from the roadway cannot take place, so that skidding of the motor vehicle is effectively prevented.

What I claim is:

1. An anti-skid device for motor vehicles comprising a straight rod, a hollow sleeve-shaped weight member, a slip ring abutment in each end of said weight member slidably mounting said weight member on said rod, stationary abutments on said rod inside said weight member, buffer springs in said weight member surrounding said rod supported by and coacting between said abutments, said weight member and said slip ring abutments completely enclosing said springs and the points of abutment thereof.

2. An anti-skid device for motor vehicles comprising a straight rod, a hollow sleeve-shaped weight member, a slip ring abutment in each end of said weight member slidably mounting said weight member on said rod, said rod extending longitudinally and centrally of said weight member, stationary abutments on said rod inside said weight member, buffer springs in said weight member surrounding said rod supported by and coacting between said abutments, said weight member and said slip ring abutments completely enclosing said springs and the points of abutment thereof.

3. An anti-skid device for motor vehicles comprising a straight rod, a hollow sleeve-shaped weight member, a slip ring abutment in each end of said weight member slidably mounting said weight member on said rod, stationary abutments on said rod inside said weight member, buffer springs in said weight member surrounding said rod, supported by and coacting between said abutments, said springs being in a prestressed condition, said weight member and said slip ring abutments completely enclosing said springs and the points of abutment thereof.

4. An anti-skid device for motor vehicles, comprising a straight rod, a hollow sleeve-shaped weight member, a slip ring abutment in each end of said weight member slidably mounting said weight member on said rod, said rod extending longitudinally and centrally of said weight member, stationary abutments on said rod inside said weight member, buffer springs in said weight member surrounding said rod and extending longitudinally and centrally of said weight member, said buffer springs being supported by and coacting between said abutment and being in a prestressed condition, said weight member and said slip ring abutments completely enclosing said springs and the points of abutment thereof.

5. An anti-skid device for motor vehicles comprising a straight rod, a tubular weight member extending substantially over the length of said rod, a slip ring abutment on each end of said weight member slidable on said rod, stationary abutments on said rod inside said weight member, buffer springs in said weight member surrounding said rod and supported by and coacting between said abutments, said weight member being carried on said rod by means of said slip ring abutments and said weight member and said slip ring abutments completely enclosing said springs and said stationary abutments.

6. An anti-skid device for motor vehicles comprising a straight rod, a tubular weight member extending substantially over the length of said rod, a slip ring abutment on each end of said weight member slidable on said rod, a felt ring in each slip ring abutment sealing up the inner space of said weight member, stationary abutments on said rod inside said weight member, buffer springs in said weight member surrounding said rod and supported by and coacting between said abutments, said weight member being carried on said rod by means of said slip ring abutments and said weight member and said slip ring abutments completely enclosing said springs and said stationary abutments.

7. An anti-skid device for motor vehicles comprising a straight rod, a hollow sleeve-shaped weight member extending substantially over the length of said rod, a slip ring abutment on each end of said weight member slidable on said rod, a flexible dust-collecting sleeve mounted on said rod externally of each said slip ring abutment, and a rigid covering cap secured to each said slip ring abutment and enclosing said dust-collecting sleeve, stationary abutments on said rod inside said weight member, buffer springs in said weight member surrounding said rod and supported by and coacting between said abutments, said weight member being carried on said rod by means of said slip ring abutments and said weight member and said slip ring abutments completely enclosing said springs and said stationary abutments.

FRANZ HANEL.

REFERENCES CITED

The following references are of record in the file of this patent:

FOREIGN PATENTS

| Number | Country | Date |
|---|---|---|
| 228,799 | Germany | Dec. 1, 1943 |